July 3, 1962 M. A. SEALE 3,042,301
TRIGONOMETRIC FUNCTION FINDING DEVICE
Filed Oct. 5, 1959

INVENTOR.
Milton A. Seale
BY Bertram H. Mann
ATTORNEY

United States Patent Office 3,042,301

Patented July 3, 1962

3,042,301

TRIGONOMETRIC FUNCTION FINDING DEVICE

Milton A. Seale, 904 Rosebud, Victoria, Tex.

Filed Oct. 5, 1959, Ser. No. 844,370
2 Claims. (Cl. 235—88)

This invention relates to devices for facilitating the finding of correlative values, such as trigonometric functions of various angles.

There appears to be a demand for a relatively compact, convenient device for easily and quickly determining the values of trigonometric functions of angles. While handbooks and lists containing such functions have long been available, these have the disadvantage of being relatively inconvenient to carry and require the user to pick out from a large list, for instance, a page, the particular desired function value. The more compact the article is made, the smaller must be the figures and lettering and the more difficult the reading thereof.

Accordingly, it is the main object of the present invention to provide a relatively compact, yet easily used and read mechanical device which bears a large number of trigonometric function values, as well as selector means for picking out and magnifying a particular value desired.

My novel device consists generally of a circular base sheet or plate having peripheral degree markings and radial lines containing function values associated with the respective degree markings. Pivotally mounted on the base sheet is a finder disc which bears minute intervals and function name notations so arranged as to expose, in each degree position, the values of various trigonometric functions in close relationship with corresponding minute intervals and function names. A magnifying glass slides along the finder both for correlating particular angles, function names, and function values and for magnifying such designations for ready reading.

In the accompanying drawings which illustrate the invention, FIG. 1 is a plan view of the device.

The device consists generally of a circular base plate A, a rotor disc or cursor B pivoted centrally thereon, and a minute finder and magnifier which slides along disc B.

Figure 1:
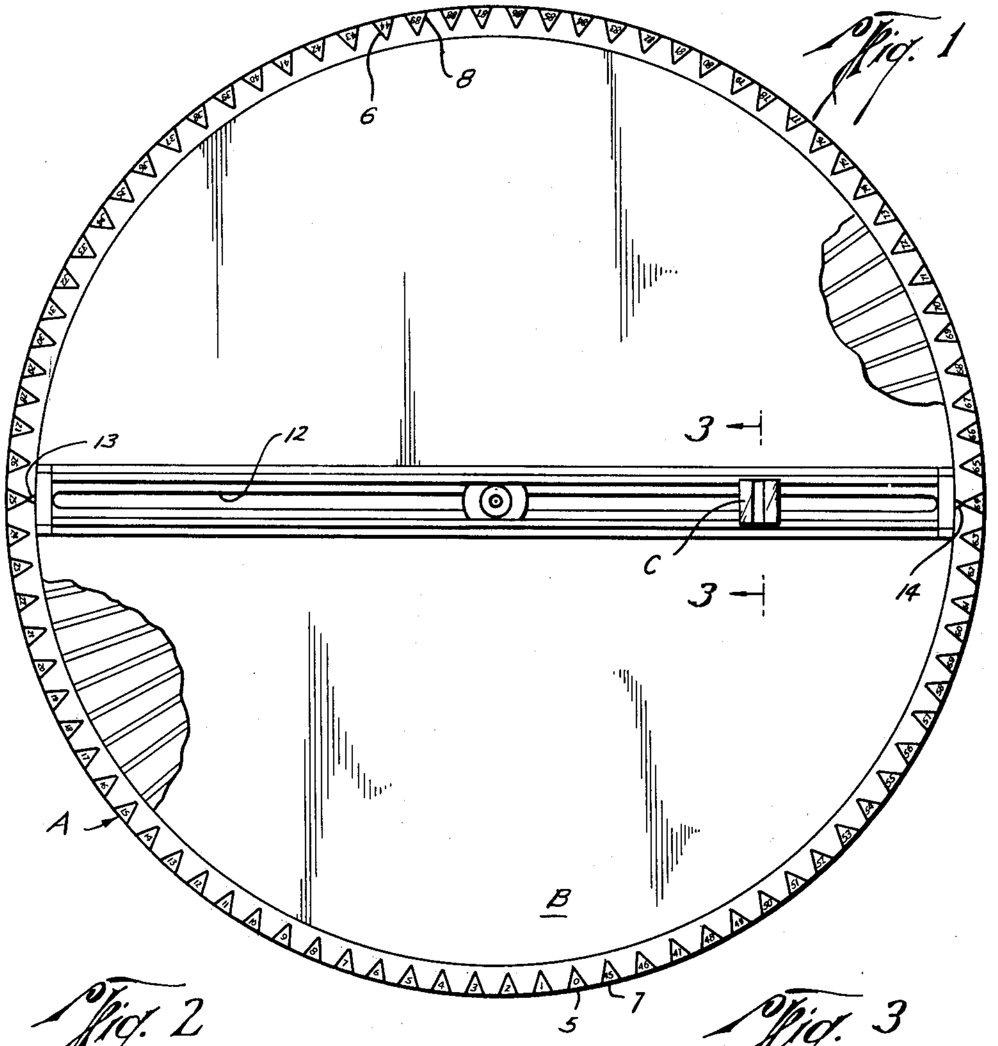
Figure 2:
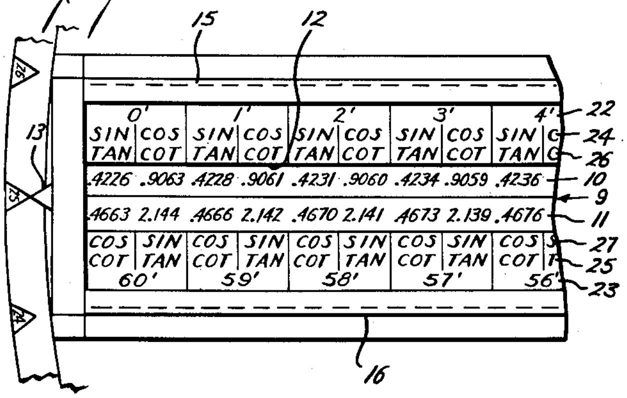
FIG. 2 is an enlarged view showing a fragment at the left extremity of the degree finder disc showing function values correlated therewith.
Figure 3:
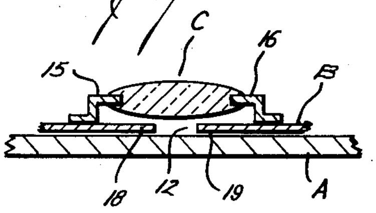
FIG. 3 is a detailed vertical transverse section taken substantially on line 3—3 of FIG. 1.

Base plate A has equally-spaced, peripheral degree markings extending from 0° at 5 to 44° at 6, in a clockwise direction and from 45° at 7 to 89° at 8, in a counterclockwise direction. Imprinted on the face of the base sheet are radial rows of function value designations, generally indicated at 9, each containing two lines of trigonometric function values, as best illustrated in FIG. 2 at 10 and 11. Each radial double row 9 is aligned with one of the peripheral degree markings and values are geometrically arranged in a particular manner, as will be described hereafter.

Rotor disc B has a slot 12 extending along a diameter longitudinally substantially from end to end thereof. Aligned with this slot are indexing points 13 and 14 in juxtaposition with the peripheral degree markings. Outstanding angular guide strips 15 and 16 parallel the slots and slidably mount minute-selecting magnifying glass C. The glass has side grooves which receive the opposed flanges of the angular guides.

Imprinted on the portions 18 and 19 of disc B immediately adjacent the edge of slot 12 and not covered by strips 15 and 16 are rows of indicia as follows: Rows 22 and 23 contain equally-spaced minute interval designations extending left to right, from 0′ to 60′ at one side of the slot and from 60′ to 0′ at the other side of the slot. Rows 24, 25, 26 and 27 contain the symbols for certain trigonometric functions of angles, in this case, sin (sine), cos (cosine), tan (tangent), and cot (cotangent). Each group of function symbols is arranged in the same geometrical pattern as the corresponding groups of function values in each radial row thereof. The groups of function symbols on opposite sides of the slot are reversed.

In the use of the device, rotor disc B is turned to bring either index 13 or 14 in direct alignment with the degree value of an angle in question. Index 13 is used for designating angles from 0° to 44°, at the left side of base A, while index 14 is used for designating angles from 45° to 89° along the right edge of the base. Slider glass C is then moved along its guide strips 15 and 16 to pick out the particular minute increment of the angle. If, for instance, one wishes to know the sine, cosine, tangent or cotangent of the angle 25° 1′, slider glass C is moved substantially to the left hand end of slot 12, guide angles 15 and 16 being continuous entirely across the rotor for this purpose. The designation "1′" then clearly appears in the upper portion of the glass and below it the function names or symbols, all enlarged so as to be clearly visible. In the exposed radial rows 10 and 11 within slot 12 and aligned with the "1′" marking appear four function values in the same geometrical relationship as the function names on the upper edge of the slot. Thus, it may be readily determined that the sine of the angle 25° 1′ is .4228, taken to four places, while the cosine of this angle is .9061, etc. For the same positioning of the slider glass the same functions of the angle 64° 59′ also may be read, the arrangement of function symbols on the lower side of slot 12 being reversed for this purpose. Thus, it clearly appears that the cosine of 64° 59′ is the same as the sine of 25° 1′.

By imprinting the data on rows 22–27 inclusive sufficiently small, a large number of trigonometric functions may be contained on a relatively small circular device, yet location and reading thereof is rendered simple by the use of rotating disc B, to find the particular degrees in question, and movement of slider glass C along slot 12 to find the particular minute interval.

The list of functions names grouped with each minute designation adjacent the edge of slot 12 in the rotor may be either decreased or increased, the groups of function value numbers in each radial row being similarly varied. The function names on the rotor may be otherwise keyed or related to corresponding function values on the base plate, than by corresponding geometrical arrangement, so as to have a readily recognized correlation. For instance, one of each pair of radial lines of numbers on the base plate may appear in a contrasting color, as red, and the corresponding rows of function names similarly colored, in which case the geometrical arrangement of the name groups need not conform to the arrangements of the groups of function values. If desired, the rotor may be simply a pivoted arm only wide enough to receive guide rail angles 15 and 16 and the underlying data rows 22–27 inclusive. The invention may be modified in these and other respects as will occur to those skilled in the art and the exclusive use of all modifications as come within the scope of the appended claims is contemplated.

I claim:

1. A trigonometric function finding device comprising a base having a plane surface with a circular degree scale, groups of function value designations arranged in radial lines on said surface, each group being arranged in a definite pattern and each line of groups corresponding with a degree marking on said scale, a cursor pivotally mounted on said base centrally with respect to said degree scale and having an index pointer movable along said scale, a radial slot in said cursor, and a minute scale on said cursor at the side of said slot, there being a plurality of function names grouped with each minute marking on said finder scale, said minute markings and name groups being spaced from the pivot of said cursor the same as the corresponding function value designations from said base surface and said groups of function values on said base surface arranged in the pattern of the corresponding function names on said cursor so as to indicate by intimate association and corresponding positioning a desired function value within said slot of a particular minute interval positioned at the side of said slot and a particular angular degree selected by said cursor.

2. A function finding device as described in claim 1 further including a minute finder incorporating a magnifying glass slidable on said pivoted cursor to facilitate visible correlation of particular function values exposed within said slot and minute markings and function names at the side of said slot.

References Cited in the file of this patent

UNITED STATES PATENTS

| | | |
|---|---|---|
| 229,118 | Gurd | June 22, 1880 |
| 540,184 | Norris | May 28, 1895 |
| 2,005,362 | Clausen | June 18, 1935 |
| 2,405,113 | Clemons et al. | Aug. 6, 1946 |
| 2,484,366 | Wilson | Oct. 11, 1949 |
| 2,637,499 | Winterfeldt | May 5, 1953 |
| 2,943,789 | Parigini | July 5, 1960 |